(12) United States Patent
Ouderkirk et al.

(10) Patent No.: US 11,314,097 B2
(45) Date of Patent: Apr. 26, 2022

(54) OPTICAL SYSTEM

(71) Applicant: 3M INNOVATIVE PROPERTIES COMPANY, St. Paul, MN (US)

(72) Inventors: Andrew J. Ouderkirk, Kirkland, WA (US); Zhisheng Yun, Woodbury, MN (US); Jo Anne Etter, Kirkland, WA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 349 days.

(21) Appl. No.: 16/472,047

(22) PCT Filed: Dec. 13, 2017

(86) PCT No.: PCT/IB2017/057906
§ 371 (c)(1),
(2) Date: Jun. 20, 2019

(87) PCT Pub. No.: WO2018/116080
PCT Pub. Date: Jun. 28, 2019

(65) Prior Publication Data
US 2020/0096780 A1 Mar. 26, 2020

Related U.S. Application Data

(60) Provisional application No. 62/436,565, filed on Dec. 20, 2016.

(51) Int. Cl.
*G02B 27/28* (2006.01)
*G02B 1/08* (2006.01)
(Continued)

(52) U.S. Cl.
CPC .............. *G02B 27/283* (2013.01); *G02B 1/08* (2013.01); *G02B 5/305* (2013.01); *G02B 27/0172* (2013.01); *G02B 27/14* (2013.01)

(58) Field of Classification Search
CPC ........ G02B 27/283; G02B 1/08; G02B 5/305; G02B 27/0172; G02B 27/14;
(Continued)

(56) References Cited

U.S. PATENT DOCUMENTS 5,644,436 A 7/1997 Togino
5,882,774 A 3/1999 Jonza
(Continued)

FOREIGN PATENT DOCUMENTS

CN 205246924 5/2016
CN 105629494 6/2016
(Continued)

OTHER PUBLICATIONS

International Search Report for PCT International Application No. PCT/IB2017/057906, dated Mar. 7, 2018, 6 pages.

*Primary Examiner* — Thomas K Pham
*Assistant Examiner* — Henry A Duong
(74) *Attorney, Agent, or Firm* — Clifton F. Richardson

(57) ABSTRACT

An optical system for displaying an object to a viewer is described. The optical system includes an integral first optical assembly, an integral second optical assembly, and an integral third optical assembly disposed between the integral first and second optical assemblies. The integral first optical assembly has a first focal length and includes one or more first optical lenses, and a reflective polarizer. The integral second optical assembly has a second focal length and includes one or more second optical lenses, and a partial reflector having an average optical reflectance of at least 30% for a desired plurality of wavelengths. The integral third optical assembly has a third focal length and includes a curved first phase retarder. The third focal length is greater than a smaller of the first and second focal lengths.

13 Claims, 6 Drawing Sheets

(51) Int. Cl.
*G02B 5/30* (2006.01)
*G02B 27/01* (2006.01)
*G02B 27/14* (2006.01)

(58) Field of Classification Search
CPC .......... G02B 5/3025; G02B 2027/0185; G02B 25/001; G02B 17/0856; G02B 5/3033; G02B 5/3041; G02F 1/133536; G02F 1/133545
USPC .................................... 359/485.03
See application file for complete search history.

(56) References Cited

U.S. PATENT DOCUMENTS

| | | | |
|---|---|---|---|
| 6,215,593 B1 | 4/2001 | Bruce | |
| 6,519,090 B2* | 2/2003 | Endo | G02B 5/3016 349/11 |
| 6,609,795 B2 | 8/2003 | Weber | |
| 8,212,859 B2 | 7/2012 | Tang | |
| 2002/0024743 A1 | 2/2002 | Endo | |
| 2002/0057498 A1* | 5/2002 | Kobayashi | G02B 27/0172 359/630 |
| 2002/0180916 A1 | 12/2002 | Schadt | |
| 2003/0028048 A1 | 2/2003 | Cherkaoui | |
| 2003/0164914 A1* | 9/2003 | Weber | G02F 1/133606 349/115 |
| 2005/0072959 A1 | 4/2005 | Moia | |
| 2007/0273970 A1* | 11/2007 | Hoppe | G02B 27/28 359/489.07 |
| 2010/0254002 A1 | 10/2010 | Merrill | |
| 2011/0193814 A1* | 8/2011 | Gay | H04N 13/395 345/173 |
| 2014/0029096 A1* | 1/2014 | Kessler | G02B 5/3058 359/465 |
| 2014/0146394 A1 | 5/2014 | Tout | |
| 2017/0068100 A1 | 3/2017 | Ouderkirk | |
| 2018/0120579 A1* | 5/2018 | Gollier | G02B 3/06 |

FOREIGN PATENT DOCUMENTS

| | | |
|---|---|---|
| CN | 205562977 | 9/2016 |
| JP | H08-223509 | 8/1996 |
| WO | WO 2017-040875 | 3/2017 |

* cited by examiner

OPTICAL SYSTEM

BACKGROUND

Optical systems may utilize a reflective polarizer and a partial reflector spaced apart from one another. Such optical systems are useful in head-mounted displays.

SUMMARY

In some aspects of the present description, an optical system for displaying an object to a viewer is provided. The optical system includes an integral first optical assembly, an integral second optical assembly, and an integral third optical assembly disposed between the integral first and second optical assemblies. The integral first optical assembly has a first focal length and includes one or more first optical lenses and a reflective polarizer substantially transmitting light having a first polarization state and substantially reflecting light having an orthogonal second polarization state. The integral second optical assembly has a second focal length and includes one or more second optical lenses and a partial reflector having an average optical reflectance of at least 30% for a desired plurality of wavelengths. The integral third optical assembly has a third focal length and includes a curved first phase retarder for changing a polarization state of light passing therethrough. The third focal length is greater than a smaller of the first and second focal lengths.

In some aspects of the present description, an optical system for displaying an object to a viewer is provided. The optical system includes an integral first optical assembly, an integral second optical assembly, and an integral third optical assembly disposed between the integral first and second optical assemblies. The integral first optical assembly includes one or more first optical lenses and a reflective polarizer substantially transmitting light having a first polarization state and substantially reflecting light having an orthogonal second polarization state. The integral second optical assembly includes one or more second optical lenses and a partial reflector having an average optical reflectance of at least 30% for a desired plurality of wavelengths. The integral third optical assembly includes a curved first phase retarder for changing a polarization state of light passing therethrough. The reflective polarizer has a first radius of curvature at an apex of the reflective polarizer, the partial reflector has a second radius of curvature at an apex of the partial reflector, and the first phase retarder has a third radius of curvature at an apex of the first phase retarder. The third radius of curvature is greater than a smaller of the first and second radii of curvature.

DETAILED DESCRIPTION

Figure 1:
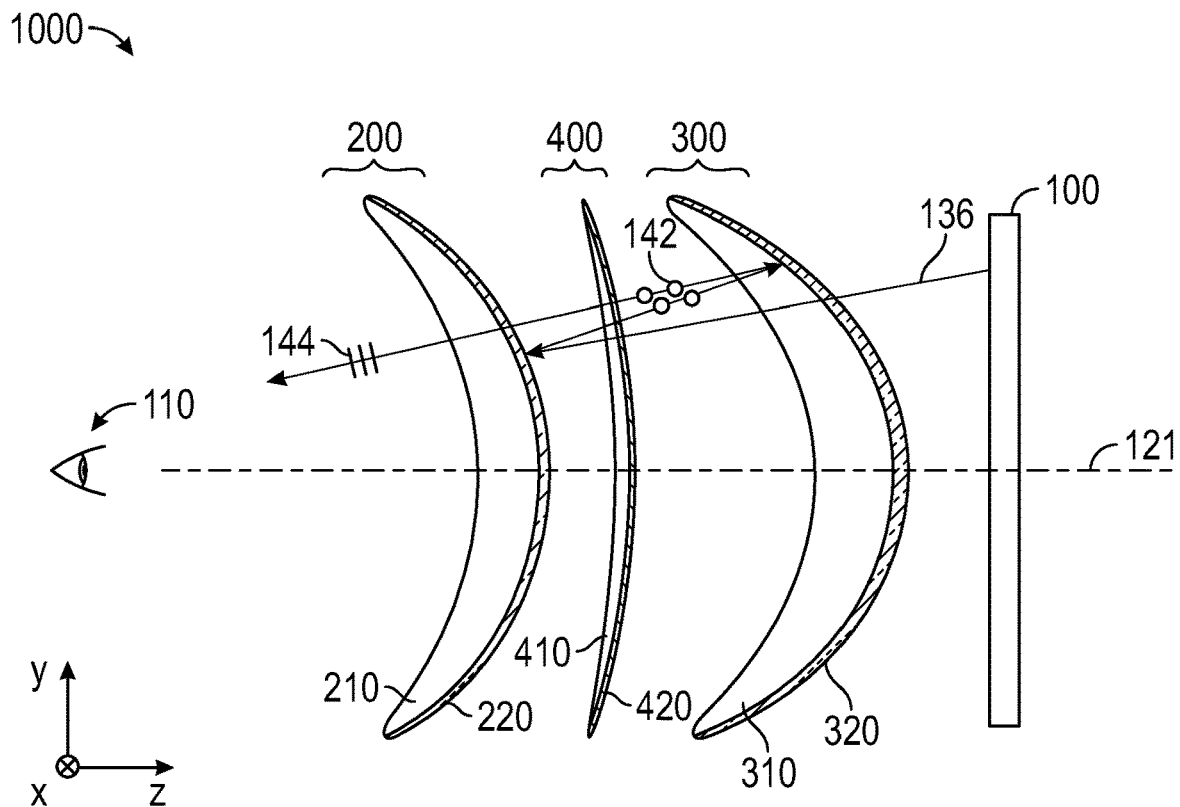
FIG. 1 is a schematic cross-sectional view of an optical system.

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Optical systems of the present description are useful in head-mounted displays, for example, where an image from a display panel is provided to a viewer. Such head-mounted displays are useful in virtual reality and/or gaming applications, for example. In some embodiments, the optical system includes a partial reflector proximate to and spaced apart from a reflective polarizer and includes a phase retarder (e.g., a quarter-wave retarder) disposed between the partial reflector and the reflective polarizer. Related optical systems are described in U.S. patent application Ser. No. 14/865,017 (Ouderkirk et al.) filed Sep. 25, 2015, which is hereby incorporated herein by reference to the extent that it does not contradict the present description.

In optical systems of the present description, the partial reflector may be disposed in or on an integral first optical assembly where the integral first optical assembly includes one or more first optical lenses. For example, the integral first optical assembly may include a single optical lens and the partial reflector may be disposed on a major surface of the single optical lens. As another example, the integral first optical assembly may include two optical lenses bonded together to form a compound lens and the partial reflector may be disposed between the two optical lenses or on a major surface of one of the two lenses. Similarly, the reflective polarized may be disposed in or on an integral second optical assembly where the integral second optical assembly includes one or more second optical lenses. An integral third optical assembly may be disposed between the integral first and second optical assemblies where the integral third optical assembly includes a curved phase retarder. For example, in some embodiments, the integral third optical assembly includes one or more third optical lenses and the phase retarder is disposed on a curved major surface of one of the third optical lenses.

According to the present description, it has been found that optical systems where the integral first, second and third optical assemblies have first, second, and third focal lengths, respectively, where the third focal length is greater than a smaller of the first and second focal lengths is particularly useful in a head-mounted display. Utilizing an integral third optical assembly including a curved phase retarder disposed between the integral first and second optical assemblies have been found to allow additional aberration correction, for example, while maintaining a compact design compared to using only two integral optical assemblies even when the integral third optical assembly has a relatively low optical power (relatively large focal length). In some cases, utilizing a relatively low optical power for the integral third optical assembly has been found to provide a more compact optical system compared to using three optical assemblies having comparable optical power. The optical systems of the present description have been found to provide a wide field of view with high contrast and low distortion, for example, in a compact system.

Figure 10:
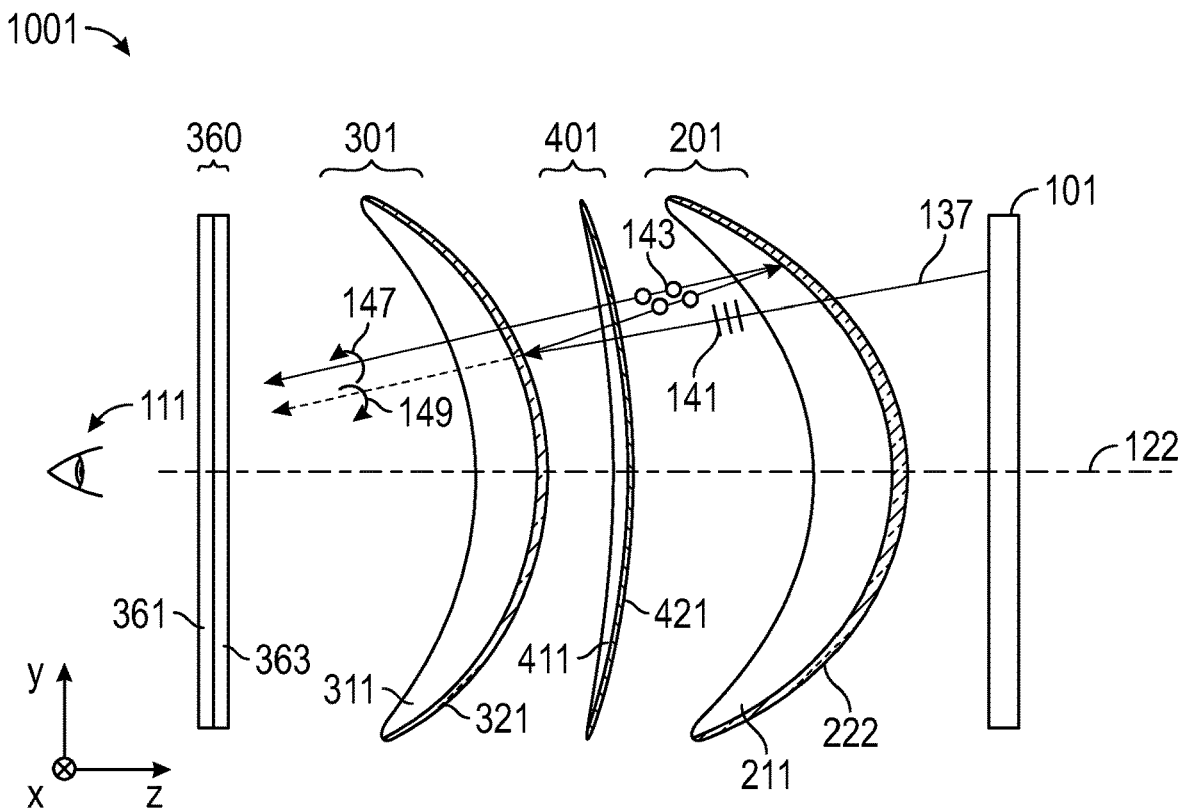
FIG. 10 is a schematic cross-sectional view of an optical system.

FIG. 1 is a schematic illustration of an optical system 1000 for displaying an object 100 to a viewer 110. The object 100 may be a display panel, for example, such as a liquid crystal display (LCD) panel or an organic light emitting diode (OLED) display panel. The optical system 1000 includes an integral first optical assembly 200, an integral second optical assembly 300, and an integral third optical assembly 400 disposed between the integral first and second optical assemblies 200 and 300. The integral first optical assembly 200 may be configured to be closer to the viewer 110 and the integral second optical assembly 300 may be configured to be farther from the viewer 110 as illustrated in FIG. 1. Alternatively, the integral first optical assembly may be configured to be farther from the viewer 110 and the integral second optical assembly may be configured to be closer to the viewer as illustrated in FIG. 10. The integral first optical assembly 200 has a first focal length and includes one or more first optical lenses 210, and includes a reflective polarizer 220 substantially transmitting light having a first polarization state (e.g., polarization state 144) and substantially reflecting light having an orthogonal second polarization state. (e.g., polarization state 142). The reflective polarizer 220 may be a polymeric multilayer optical film polarizer or a wire-grid polarizer, for example. The integral second optical assembly 300 has a second focal length and includes one or more second optical lenses 310, and includes a partial reflector 320 having an average optical reflectance of at least 30% for a desired plurality of wavelengths. The integral third optical assembly 400 has a third focal length and includes a curved first phase retarder 420 for changing a polarization state of light passing therethrough. In some embodiments, the integral third optical assembly 400 includes one or more third optical lenses 410. The third focal length is greater than a smaller of the first and second focal lengths. In some embodiments, the third focal length is greater than the larger of the first and second focal lengths. In some embodiments, the third focal length is at least twice the smaller of the first and second focal lengths. In some embodiments, the third focal length is at least twice the larger of the first and second focal lengths.

In other embodiments, one or more of the partial reflector 320, the first phase retarder 420 and the reflective polarizer 220 is disposed on a different major surface of the one or more optical lenses 310, 410 and 210, respectively, than those illustrated in FIG. 1. For example, partial reflector 320 may alternatively be disposed on the major surface of one or more second optical lenses 310 facing the viewer 110. In this case an additional film or component (e.g., a polarizer and/or a phase retarder) may be disposed on the major surface of the one or more second optical lenses 310 facing the object 100. In some embodiments, each major surface of each of the integral first, second and third optical assemblies 200, 300 and 400 are concave towards the viewer 110.

A reflective polarizer may be said to substantially transmit light having a first polarization state if at least 60 percent of light having the first polarization state in a desired plurality of wavelengths (e.g., a range of 400 nm to 700 nm) is transmitted through the polarizer. In some embodiments, at least 70 percent, or at least 80 percent, of light having the first polarization state in the desired plurality of wavelengths is transmitted through the polarizer. A reflective polarizer may be said to substantially reflect light having a second polarization state if at least 60 percent of light having the second polarization state in a desired plurality of wavelengths (e.g., a range of 400 nm to 700 nm) is reflected from the reflective polarizer. In some embodiments, at least 70 percent, or at least 80 percent, of light having the second polarization state in the desired plurality of wavelengths is reflected from the polarizer.

The desired plurality of wavelengths may be the visible wavelength range of 400 nm to 700 nm, for example. Other wavelength ranges may also be used. For example, the desired plurality of wavelengths may include only a portion of the visible range (e.g., 450 nm to 680 nm) or may include narrow bands within the visible range (e.g., red, green and blue bands each having a bandwidth of no more than 50 nm) chosen to overlap with monochromatic or approximately monochromatic light sources. In such cases, the reflective polarizer 220 may be a notch reflective polarizer and the partial reflector 320 may be a notch reflective polarizer as described further in U.S. patent application Ser. No. 14/865,017 (Ouderkirk et al.), previously incorporated herein by reference.

A portion of light rays 136 emitted by the object 100 passes through integral second optical assembly 300, passes through integral third optical assembly 400, reflects from the reflective polarizer 220 of the integral first optical assembly 200, passes back through integral third optical assembly 400, passes through one or more second optical lenses 310, reflects from partial reflector 320, passes back through one or more second optical lenses 310, and passes through the integral third and first optical assemblies to the viewer 110. Each of the lenses may have optical power (finite focal length) as described further elsewhere herein. In some embodiments, first phase retarder 420 is a quarter-wave retarder at at least one wavelength in the desired plurality of wavelengths, and light rays 136 which are first incident on reflective polarizer 220 in a block state (e.g., polarization state 142), are incident on reflective polarizer 220 in an orthogonal pass state (e.g., polarization state 144) after passing twice through first phase retarder 420. In other embodiments, the first phase retarder 420 is an eighth-wave retarder at at least one wavelength in the desired plurality of wavelengths and integral third optical assembly 400 includes a second phase retarder (e.g., on a different major surface of the one or more third optical lenses 410) which is also an eighth-wave retarder.

In some embodiments, the object 100 is a display panel configured to emit circularly polarized light. For example, a display panel may include a quarter-wave retarder and a linear polarizer in order to produce circularly polarized light. In some embodiments, an optional additional polarizer including a linear polarizer and a second phase retarder, which may be a quarter-wave retarder, is disposed between the integral second optical assembly 300 and the object 100.

The integral first optical assembly may be disposed between the display panel and the integral second optical assembly, or the integral second optical assembly may be disposed between the display panel and the integral first optical assembly. FIG. 10 is a schematic illustration of an optical system 1001 for displaying an object 101 to a viewer 111. Optical system 1001 may correspond to optical system 1000 except for the relative positions of the integral optical assemblies and the optional additional polarizer. The object 101 may be a display panel, for example, such as a liquid crystal display (LCD) panel or an organic light emitting diode (OLED) display panel. The optical system 1001 includes an integral first optical assembly 201, an integral second optical assembly 301, and an integral third optical assembly 401 disposed between the integral first and second optical assemblies 201 and 301. In the illustrated embodiment, the integral first optical assembly 201 is configured to be farther from the viewer 111 and the integral second optical assembly 301 is configured to be closer to the viewer 111. The integral first optical assembly 201 has a first focal length and includes one or more first optical lenses 211, and includes a reflective polarizer 222 substantially transmitting light having a first polarization state (e.g., polarization state 141) and substantially reflecting light having an orthogonal second polarization state. (e.g., polarization state 143). The reflective polarizer 222 may be a polymeric multilayer optical film polarizer or a wire-grid polarizer, for example. The integral second optical assembly 301 has a second focal length and includes one or more second optical lenses 311, and includes a partial reflector 321 having an average optical reflectance of at least 30% for a desired plurality of wavelengths. The integral third optical assembly 401 has a third focal length and includes a curved first phase retarder 421 for changing a polarization state of light passing therethrough. In some embodiments, the integral third optical assembly 401 includes one or more third optical lenses 411. The third focal length is greater than a smaller of the first and second focal lengths. In some embodiments, the third focal length is greater than the larger of the first and second focal lengths. In some embodiments, the third focal length is at least twice the smaller of the first and second focal lengths. In some embodiments, the third focal length is at least twice the larger of the first and second focal lengths.

Optical system 1001 further includes an optional additional polarizer 360 which includes a second phase retarder 363, which may be a quarter-wave retarder, and a linear polarizer 361. In the illustrated embodiment, light rays 137 emitted by object 101 have the polarization state 141 after passing through the reflective polarizer 222. A portion of the light rays 137 is reflected from partial reflector 321 and is reflected from the reflective polarizer 222 in polarization state 143 after passing through first phase retarder 421. These light rays are incident on polarizer 360 in polarization state 147 and are transmitted to viewer 111. Another portion of the light rays 137 is transmitted through partial reflector 321 in polarization state 149. This portion of the light rays 137 is blocked by polarizer 360 and is not transmitted to viewer 111.

Figure 6:
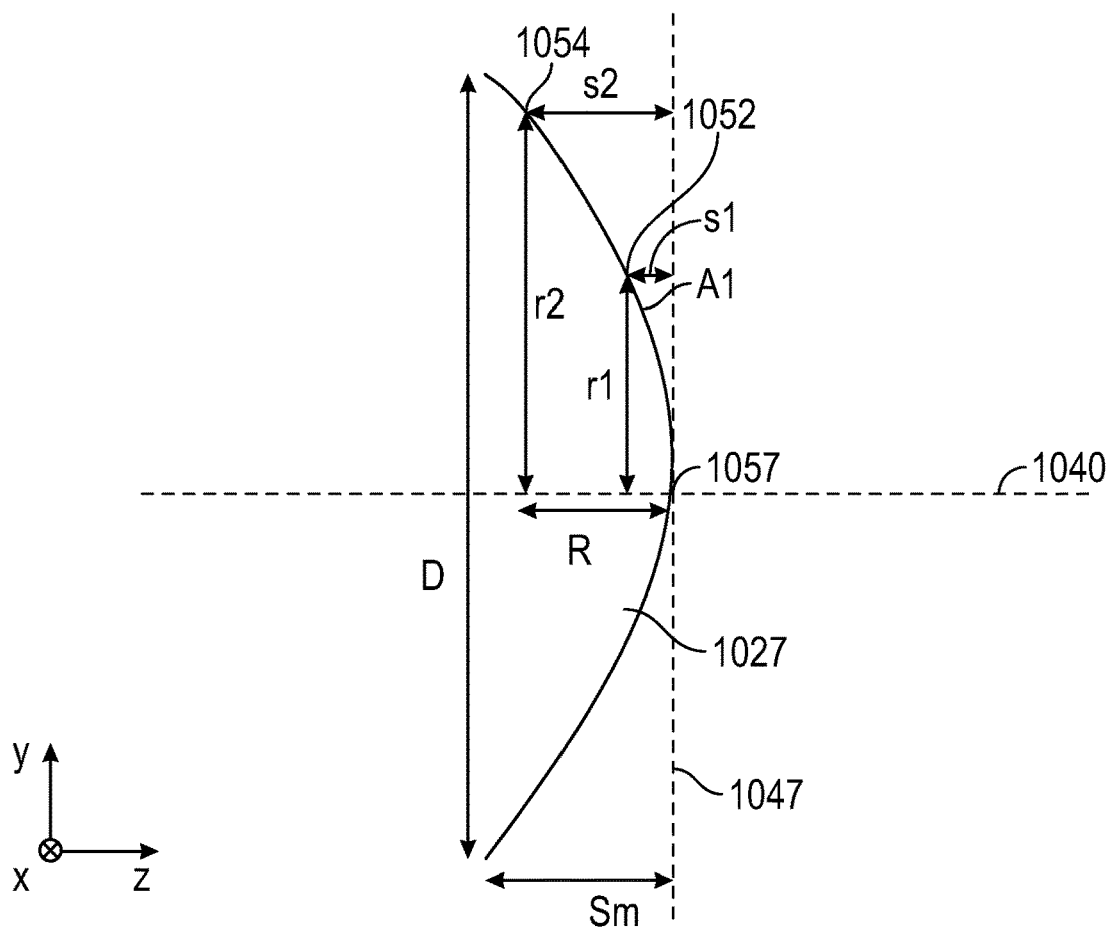
FIG. 6 is a schematic cross-sectional view of a curved layer of an optical system.

In some embodiments, the reflective polarizer, the partial reflector and/or the phase retarder is curved about two orthogonal axes. For example, the reflective polarizer may be disposed on a spherical or aspherical surface of a lens. FIG. 6 is a cross-sectional view of layer 1027 which has apex 1057 and is curved about two orthogonal axes (e.g., the x-axis and the y-axis). Layer 1027 may be a partial reflector, a phase retarder or a reflective polarizer. The layer 1027 has at least one first location 1052 having a radial distance r1 from an optical axis 1040 passing through the apex 1057, and a displacement s1 from a plane 1047 (parallel to the x-y plane) perpendicular to the optical axis 1040 at the apex 1057. In some embodiments, the layer 1027 is a reflective polarizer and the ratio s1/r1 is at least 0.1, or at least 0.2, and may be less than 0.8 or less than 0.6. For example, in some embodiments, s1/r1 is in a range of 0.2 to 0.8 or in a range of 0.3 to 0.6. The layer 1027 has at least one second location 1054 having a radial distance r2 from the optical axis 1040 and a displacement s2 from the plane 1047. In some embodiments, layer 1027 is a reflective polarizer and s2/r2 is at least 0.3, and may be less than 0.8. The layer 1027 has a diameter D, a maximum sag Sm and a radius of curvature R at the apex 1057. In some embodiments, each of the reflective polarizer and the phase retarder is curved about two orthogonal axes. In some embodiments, each of the reflective polarizer, the phase retarder and the partial reflector is curved about two orthogonal axes.

In some embodiments, the reflective polarizer is rotationally symmetric or substantially rotationally symmetric about optical axis 1040. A film or component may be said to be substantially rotationally symmetric if the azimuthal variation in the shape of the film or component is no greater than about 10 percent. Azimuthal variation refers to variation with the azimuthal angular coordinate about the optical axis 1040 or 1140 through the apex 1057 or 1157, referring to FIGS. 6 and 7. In some embodiments, the azimuthal variation in s1/r1 is less than 10 percent, or less than 8 percent, or less than 6 percent, or less than 4 percent, or less than 2 percent, or less than 1 percent, or even less than 0.5 percent. The one or more locations 1052 may be a ring of locations having a common radial distance r1 from the optical axis 1040, and similarly the one or more locations 1054 may be a ring of locations having a common radial distance r2 from the optical axis 1040. A film may be said to be rotationally symmetric if the azimuthal variation in the shape of the film is sufficiently small that the film can be molded into a rotationally symmetric lens without wrinkling the film. The coordinates s1 and r1 define an area A1 of the layer 1027 having a radial position from the optical axis 1040 of no more than r1 or having a distance along the optical axis from the apex 1057 of no more than s1.

Figure 7:
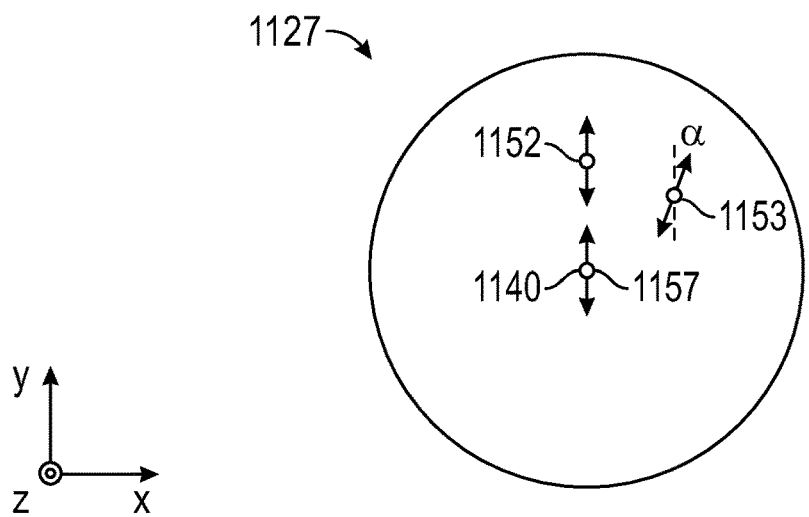
FIG. 7 is a schematic front view of a reflective polarizer.

FIG. 7 is a front view of reflective polarizer 1127, which may correspond to layer 1027. Reflective polarizer 1127 is curved about two orthogonal axes (e.g., the x- and y-axes) and has an apex 1157 and an optical axis 1140 (parallel to z-axis) passing through apex 1157. The reflective polarizer 1127 may be a polymeric multilayer reflective polarizer and may have at least one layer (e.g., layers 1272 of FIG. 8) that is substantially uniaxailly oriented at the apex 1157. For example, the orientation of the at least one layer may be in the y-direction as indicated by the arrow at apex 1157. This direction may also be a block direction for the reflective polarizer 1127 and the orthogonal direction (x-direction) may be transmission axis for the reflective polarizer. Reflective polarizer 1127 also includes at least one layer that is substantially optically biaxial at at least one first location 1153 on the at least one layer away from the optical axis 1140 and substantially optically uniaxial at at least one second location 1152 away from the optical axis.

A polymeric multilayer optical film may be formed (e.g., thermoformed) to provide reflective polarizer 1127. The optical film may initially have at least one layer uniaxially oriented with a block axis along the y-direction. During forming the optical film is stretched to conform to the shape of a tool. The optical film is stretched since the desired shape is curved about two orthogonal axes. In contrast to this, an optical film would not need to be stretched to conform to a shape curved about only one axis. The process of forming can leave the optical film substantially uniaxially oriented at second location 1152 (since the film is stretched along the orientation direction at this location during forming), but result in biaxial orientation at first location 1153 due to the stretching of the optical film as it is formed. The block axes at first and second locations 1153 and 1152 are indicated by the arrows at those locations. The block axis is shifted by a degrees at the first location 1153. The transmission axis may orthogonal to the block axis and may also be shifted by a degrees at the first location 1153. In some embodiments, a maximum variation of a transmission axis (or of a block axis) of the reflective polarizer 1127 is less than about 5 degrees, or less than about 3 degrees, or less than about 2 degrees, or less than about 1.5 degrees, or less than about 1 degree over the entire area of the reflective polarizer or over an area of the reflective polarizer defined by s1 and r1, or over a reflection aperture of the reflective polarizer, where s1 and s2 are as described for layer 1027. The reflection aperture refers to the portion of the reflective polarizer that is utilized by the optical system in reflection. The reflection aperture may be substantially the entire area of the reflective polarizer or may exclude a portion of the reflective polarizer near a boundary of the reflective polarizer. The maximum variation of the transmission axis may be determined as the maximum angular difference between the transmission axis and a fixed direction (e.g., the x-direction in FIG. 7) minus the minimum angular difference between the transmission axis and a fixed direction.

Any of the reflective polarizers used in any of the optical systems described herein may be linear reflective polarizers which may be adapted to reflect light having a first linear polarization state and transmit light having a second linear polarization state orthogonal to the first linear polarization state.

Figure 8:
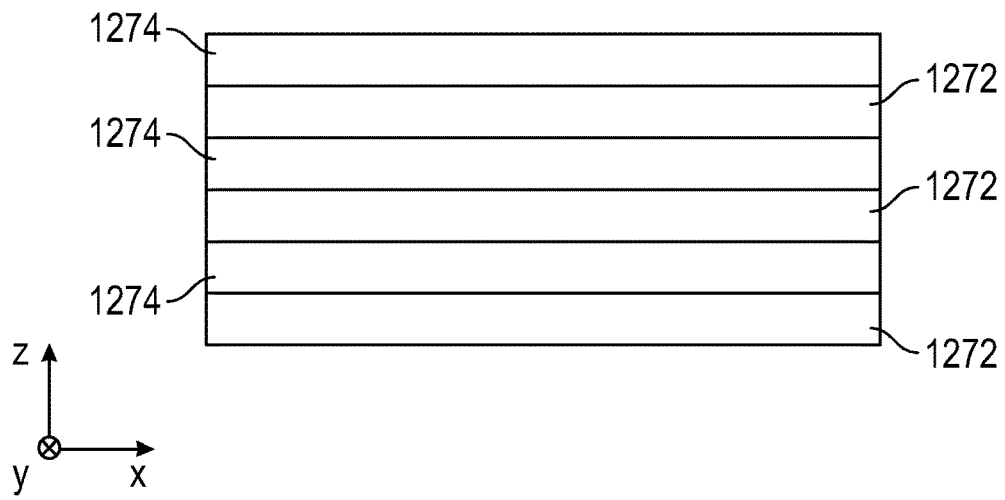
FIG. 8 is a schematic cross-sectional view of a reflective polarizer.

Any of the reflective polarizers used in any of the optical systems of the present description may be a thermoformed reflective polarizer which may be a thermoformed polymeric multilayer optical film. The polymeric multilayer optical film may include a plurality of alternating first and second polymeric layers. This is illustrated in FIG. 8 which is a side view of reflective polarizer 1227 including alternating first polymeric layers 1272 and second polymeric layers 1274. The out-of-plane (thickness) z-direction and orthogonal in-plane x- and y-directions are indicated in the figure. Suitable polymeric multilayer reflective polarizers are described, for example, in U.S. Pat. No. 5,882,774 (Jonza et al.), and U.S. Pat. No. 6,609,795 (Weber et al.). Methods of forming a reflective polarizer into a compound curve are described in U.S. patent application Ser. No. 14/865,017 (Ouderkirk et al.), previously incorporated herein by reference, and PCT Appl. No. US2016/050024 (Ouderkirk et al.) filed Sep. 2, 2016 and hereby incorporated herein by reference to the extent that it does not contradict the present description.

In some embodiments, the reflective polarizer used in the optical system of the present description (e.g., reflective polarizer 220) is a multilayer optical film that, prior to being formed (e.g., thermoformed) into the desired shape for the optical lens, is substantially uniaxially oriented in that it has a degree of uniaxial character U of at least 0.7, or at least 0.8, or at least 0.85, where $U=(1/MDDR-1)/(TDDR^{1/2}-1)$ with MDDR defined as the machine direction draw ratio and TDDR defined as the transverse direction draw ratio. Such substantially uniaxially oriented multilayer optical films are described in U.S. Pat. No. 2010/0254002 (Merrill et al.) and may include a plurality of alternating first and second polymeric layers with the first polymeric layers having indices of refraction in a length direction (e.g., x-direction) and a thickness direction (e.g., z-direction) that are substantially the same, but substantially different from an index of refraction in a width direction (e.g., y-direction). For example, the absolute value of the difference in the refractive indices in the x- and z-directions may be less than 0.02 or less than 0.01, and the absolute value of the difference in the refractive indices in the x- and y-directions may be greater than 0.05, or greater than 0.10. Unless specified differently, refractive index refers to the refractive index at a wavelength of 550 nm. Substantially uniaxially oriented reflective polarizers are available from 3M Company under the trade designation APF. Other types of multilayer optical film reflective polarizers (e.g., DBEF available from 3M Company) may also be used. In other embodiments, other types of reflective polarizes (e.g., wire-grid polarizers) are used.

The phase retarder(s) (e.g., first phase retarder 420) used in the optical systems of the present description can be films or coatings. Suitable coatings for forming a phase retarder include the linear photopolymerizable polymer (LPP) materials and the liquid crystal polymer (LCP) materials described in U.S. Pat. App. Pub. Nos. U.S. 2002/0180916 (Schadt et al.), U.S. 2003/028048 (Cherkaoui et al.) and U.S. 2005/0072959 (Moia et al.). Suitable LPP materials include ROP-131 EXP 306 LPP and suitable LCP materials include ROF-5185 EXP 410 LCP, both available from Rolic Technologies, Allschwil, Switzerland.

The partial reflector (e.g., partial reflector 320) used in the optical lenses of the present description may be any suitable partial reflector. For example, the partial reflectors may be constructed by coating a thin layer of a metal (e.g., silver or aluminum) on a transparent substrate. The partial reflector may also be formed by depositing thin-film dielectric coatings onto a surface of a lens substrate, or by depositing a combination of metallic and dielectric coatings on the surface, for example. In some embodiments, the partial reflector has an average optical reflectance and an average optical transmittance in the desired plurality of wavelengths that are each in a range of 30% to 70%, or each in a range of 40% to 60%, or each in a range of 45% to 55%. The partial reflector may be a half mirror, for example.

Figure 11:
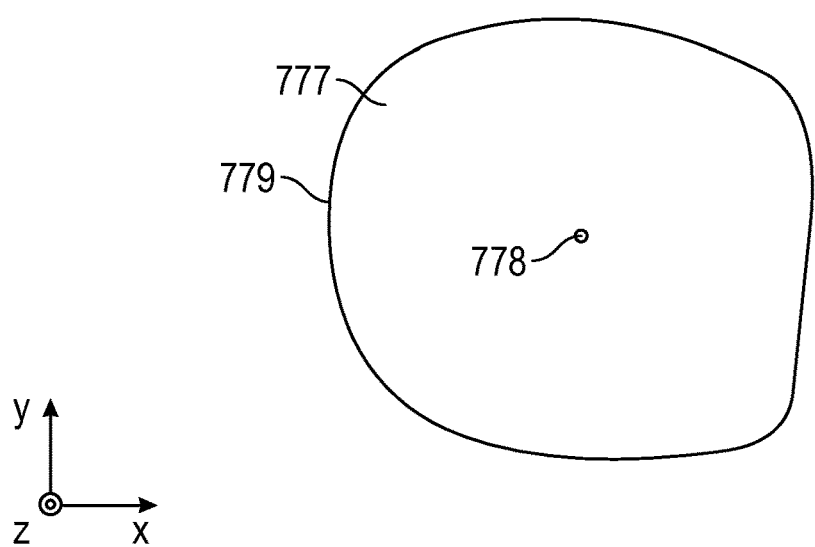
FIG. 11 is a schematic from view of a lens or integral optical assembly.

In some embodiments, the optical system 1000 has an optical axis 121, and similarly, in some embodiments, optical system 1001 has an optical axis 122. In some embodiments, each lens of the optical system 1000 (or 1001) is rotationally symmetric about the optical axis 121 (or 122). In other embodiments, one or more optical lenses is rotationally asymmetric about optical axis 121 (or 122). For example, in some embodiments, lens(es) or optical element(s) of the optical system may be rotationally asymmetric about the optical axis at least in part due a rotationally asymmetric edge of the lens(es) or optical element(s) and/or due to an azimuthal dependence of the curvature of a surface of the lens(es) or optical element(s). FIG. 11 is a schematic front view of a lens or integral optical assembly 777, which may correspond to any of the first, second, or third integral optical assemblies described elsewhere herein, and which includes a rotationally asymmetric edge 779 which is not symmetric about the optical axis 778. Utilizing rotationally asymmetric lenses or optical elements allows the optical systems to be used in head-mounted displays to provide a wide field of view in a compact system having a low profile as described further in PCT Appl. No. US2016/050024 (Ouderkirk et al.) previously incorporated herein by reference.

The optical axis of such a rotationally asymmetric lens or optical element can be understood as an axis near the center of the lens or optical element where a light ray emitted by a display and propagating along the optical axis passes through the lens(es) and/or optical element(s) with a minimum degree of refraction so that light propagation along axes close to but different from the optical axis experience greater degrees of refraction. The light ray along the optical axis may pass through the lens(es) and/or optical element(s) without being refracted or without being substantially refracted. Without being substantially refracted means that the angle between a light ray incident on a surface and a light ray transmitted through the surface is no more than 15 degrees. In some embodiments, an angle between the incident ray and the transmitted ray is less than 10 degrees, or less than 5 degrees, or less than 3 degrees, or less than 2 degrees. In some embodiments, an optical system includes integral first, second and third optical assemblies, and a light ray propagating along the optical axis of the optical system passes through integral first, second and third optical assemblies without being substantially refracted. In some embodiments, a light ray propagating along the optical axis passes through integral first, second and third optical assemblies without being refracted by more than 10 degrees, or more than 5 degrees, or more than 3 degrees, or more than 2 degrees at any major surface of the optical system.

Figure 2:
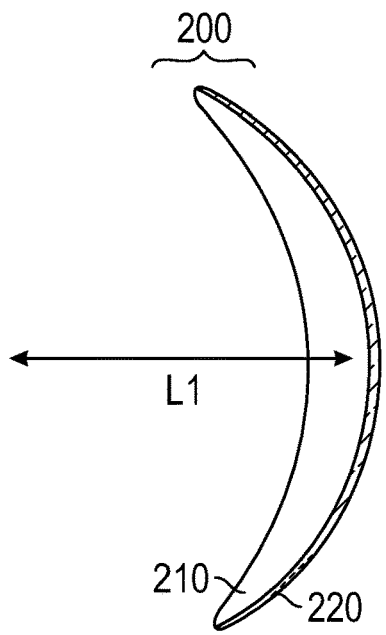
FIG. 2 is a schematic cross-sectional view of an integral first optical assembly.
Figure 3:
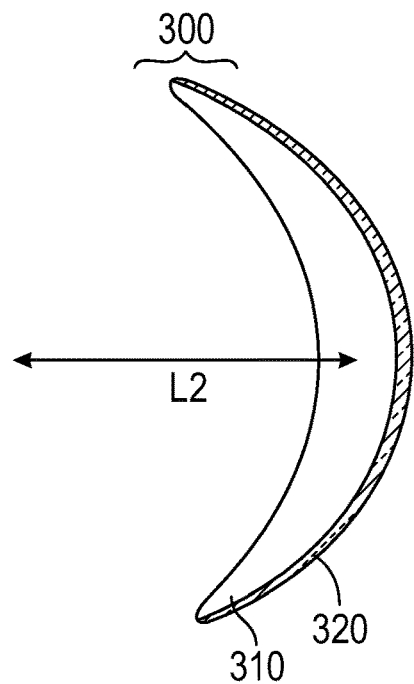
FIG. 3 is a schematic cross-sectional view of an integral second optical assembly.
Figure 4:
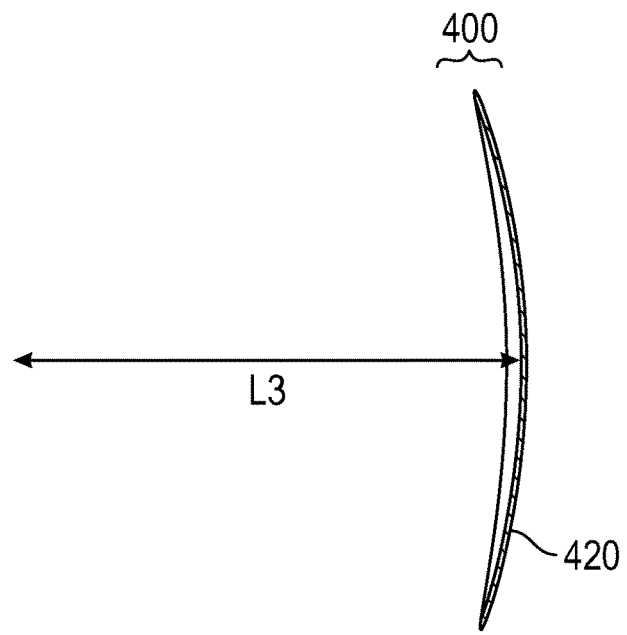
FIG. 4 is a schematic cross-sectional view of an integral third optical assembly.

FIG. 2 is a schematic cross-sectional view of the integral first optical assembly 200 showing the first focal length L1. FIG. 3 is a schematic cross-sectional view of the integral second optical assembly 300 showing the second focal length L2. FIG. 4 is a schematic cross-sectional view of the integral third optical assembly 400 showing the third focal length L3. If light propagating from infinity near an optical axis (initially collimated paraxial light rays) of a lens or integral optical assembly is focused to a focal point, then the lens or integral optical assembly has a focal length given by the distance between the lens or integral optical assembly (e.g., a point along an optical axis of the lens or integral optical assembly at a midpoint of the lens or integral optical assembly) and the focal point. If a lens or integral optical assembly does not focus a broad beam of light from infinity to a point but nevertheless focuses paraxial rays to a focal point, then the lens or integral optical assembly has a focal length from the lens or integral optical assembly to the focal point. In some embodiments, a lens or integral optical assembly has different focal points and corresponding different focal lengths for light propagating in different planes (e.g., y-z plane vs. x-z plane). For example, a surface of a lens may have different radii of curvature at the vertex of the lens in different planes and this can result in different optical power for light propagating in the different planes. In some embodiments, a lens or integral optical assembly has a same focal length for paraxial rays in all planes.

The focal length of a lens or an integral optical assembly can be determined from the curvatures of and distances between the various surfaces of the lens or integral optical assemblies and the refractive indices of the various components of the lens or integral optical assemblies. The curvature can be described in terms of a radius of curvature at the apex or vertex of a component or along the optical axis of the optical system. The radius of curvature may be different in different planes or may be the same in all planes.

In some embodiments, the third focal length L3 is no more than 10 times a larger of the first and second focal lengths L1 and L2. In some embodiments, the third focal length L3 is no more than 10 times the smaller of the first and second focal lengths L1 and L2. In some embodiments, the first and second focal lengths L1 and L2 are different (e.g., the larger of the first and second focal lengths may be at least 5 percent, or at least 10 percent greater than the smaller of the first and second focal lengths). In some embodiments, the first and second focal lengths L1 and L2 are substantially the same (e.g., the larger of the first and second focal lengths may be no more than 10 percent, or no more than 5 percent greater than the smaller of the first and second focal lengths). In some embodiments, the one or more lenses of each of the integral first, second and third optical assemblies 200, 300 and 400, respectively, are converging lenses or converging lens stacks.

The integral first, second and third optical assemblies 200, 300 and 400, respectively, may be described in terms of optical power rather than focal length. An optical power is an inverse of a focal length. The integral third optical assembly 400 may have an optical power of at least 0.1 times the lower of the optical powers of the integral first and second optical assemblies 200 and 300. The integral third optical assembly 400 may have an optical power of no more than 0.5 times the larger of the optical powers of the integral first and second optical assemblies 200 and 300.

The integral first, second and third optical assemblies 200, 300 and 400, respectively, may be described in terms of a radius of curvature of the reflective polarizer at an apex of the reflective polarizer (first radius of curvature), a radius of curvature of the partial reflector at an apex of the partial reflector (second radius of curvature), and a radius of curvature of the first phase retarder at an apex of the first phase retarder (third radius of curvature), respectively. In some embodiments, the third radius of curvature is no more than 10 times a larger of the first and second radii of curvature. In some embodiments, the third radius of curvature is no more than 10 times the smaller of the first and second radii of curvature. In some embodiments, the first and second radii of curvature are different (e.g., the larger of the first and second radii of curvature may be at least 5 percent, or at least 10 percent greater than the smaller of the first and second radii of curvature). In some embodiments, the first and second radii of curvature are substantially the same (e.g., the larger of the first and second radii of curvature may be no more than 10 percent, or no more than 5 percent greater than the smaller of the first and second radii of curvature).

Figure 5:
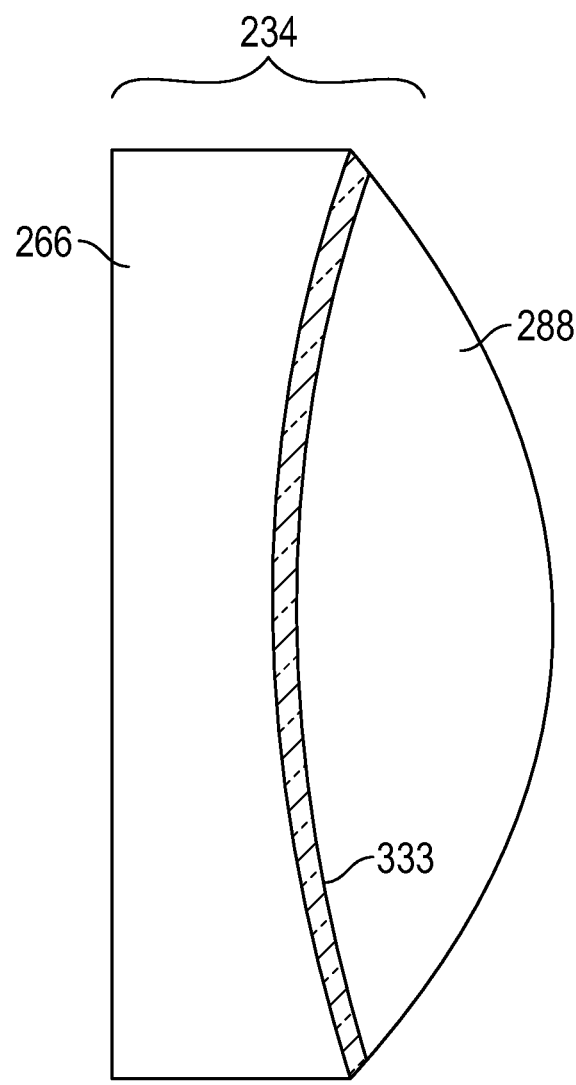
FIG. 5 is a schematic cross-sectional view of an integral optical assembly including two optical lenses.

In some embodiments, one or more of the first, second and third integral optical assemblies includes more than one lens. An illustrative example is shown in FIG. 5 which shows an integral optical assembly 234 including first and second optical lenses 266 and 288 with a layer 333 disposed between the first and second optical lenses 266 and 288. Integral optical assembly 234 may correspond to any of the first, second and third optical assemblies described elsewhere herein (e.g., integral optical assembly 200, 300 or 400) and the layer 333 may be a partial reflector, a phase retarder or a partial reflector, for example. In other embodiments, the layer 333 may be disposed on an outer major surface of the first or second optical lenses 266 and 288 rather than at an interface between the two lenses. Other compound lens designs can be used in any of the integral optical assemblies of the present description. In some embodiments, one or more of the first, second and third optical assemblies includes a doublet lens, a triplet lens and/or an achromatic lens.

Figure 9:
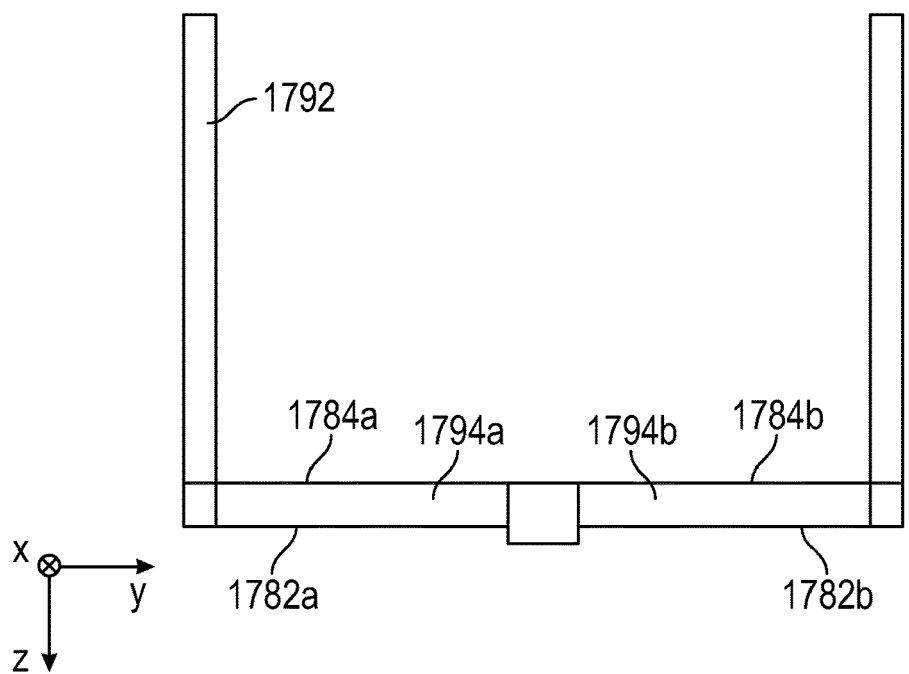
FIG. 9 is a schematic top view of a head-mounted display.

Any of the optical systems of the present description may be used in a device such as a head-mounted display (e.g., a virtual reality display). FIG. 9 is a schematic top view of head-mounted display 1790 including a frame 1792, and first and second display portions 1794a and 1794b. First and second display portions 1794a and 1794b include outer surfaces 1782a and 1782b, respectively, and inner surfaces 1784a and 1784b, respectively. Each of the first and second display portions 1794a and 1794b may include an optical systems of the present description. For example, first display portion 1794a (and similarly for second display portion 1794b) may include the optical system 1000 with a display panel (corresponding to object 100) adjacent the outer surface 1782a, the integral second optical assembly 300 facing the display panel, and the integral first optical assembly 200 facing the inner surface 1784a. As another example, first display portion 1794a (and similarly for second display portion 1794b) may include the optical system 1001 with a display panel (corresponding to object 101) adjacent the outer surface 1782*a*, the integral first optical assembly 201 facing the display panel, and the integral second optical assembly 301 facing the inner surface 1784*a*. In some embodiments, a single display panel spanning portions 1794*a* and 1794*b* may be used instead of separate display panels. Head-mounted display 1790 may further include a camera and/or an eye tracking system as described further in U.S. patent application Ser. No. 14/865,017 (Ouderkirk et al.), previously incorporate herein by reference.

The following is a list of exemplary embodiments.

Embodiment 1 is an optical system for displaying an object to a viewer, comprising:
- an integral first optical assembly, the integral first optical assembly having a first focal length and comprising:
  - one or more first optical lenses; and
  - a reflective polarizer substantially transmitting light having a first polarization state and substantially reflecting light having an orthogonal second polarization state;
- an integral second optical assembly, the integral second optical assembly having a second focal length and comprising:
  - one or more second optical lenses; and
  - a partial reflector having an average optical reflectance of at least 30% for a desired plurality of wavelengths; and
- an integral third optical assembly disposed between the integral first and second optical assemblies, the integral third optical assembly having a third focal length and comprising a curved first phase retarder for changing a polarization state of light passing therethrough,
- wherein the third focal length is greater than a smaller of the first and second focal lengths.

Embodiment 2 is the optical system of Embodiment 1, wherein the third focal length is greater than the larger of the first and second focal lengths.

Embodiment 3 is the optical system of Embodiment 1, wherein the third focal length is at least twice the smaller of the first and second focal lengths.

Embodiment 4 is the optical system of Embodiment 1, wherein the third focal length is at least twice the larger of the first and second focal lengths.

Embodiment 5 is the optical system of any one of Embodiments 1 to 4, wherein the third focal length is no more than 10 times a larger of the first and second focal lengths.

Embodiment 6 is the optical system of any one of Embodiments 1 to 4, wherein the third focal length is no more than 10 times the smaller of the first and second focal lengths.

Embodiment 7 is the optical system of Embodiment 1, where the first and second focal lengths are different.

Embodiment 8 is the optical system of Embodiment 1, wherein the first and second focal lengths are substantially the same.

Embodiment 9 is the optical system of Embodiment 1, comprising a display panel disposed proximate the second integral optical assembly opposite the first integral optical assembly.

Embodiment 10 is the optical system of Embodiment 1, wherein the desired plurality of wavelengths comprise a wavelength range of 400 nm to 700 nm.

Embodiment 11 is the optical system of Embodiment 1, wherein the reflective polarizer is a wire grid polarizer.

Embodiment 12 is the optical system of Embodiment 1, wherein the reflective polarizer is a polymeric multilayer optical film.

Embodiment 13 is the optical system of Embodiment 12, wherein the polymeric multilayer optical film comprises at least one layer that is substantially optically biaxial at at least one first location on the at least one layer away from an optical axis passing through an apex of the reflective polarizer and substantially optically uniaxial at at least one second location away from the optical axis.

Embodiment 14 is the optical system of any one of Embodiments 1 to 13, wherein the reflective polarizer is curved about two orthogonal axes.

Embodiment 15 is the optical system of any one of Embodiments 1 to 14, wherein the reflective polarizer has at least one first location having a radial distance, $r1$, from an optical axis passing through an apex of the reflective polarizer, and a displacement, $s1$, from a plane perpendicular to the optical axis at the apex, $s1/r1$ being at least 0.1.

Embodiment 16 is the optical system of Embodiment 15, wherein $s1/r1$ is at least 0.2.

Embodiment 17 is the optical system of Embodiment 1, further comprising a display panel, wherein the integral first optical assembly is disposed between the display panel and the integral second optical assembly.

Embodiment 18 is the optical system of Embodiment 1, further comprising a display panel, wherein the integral second optical assembly is disposed between the display panel and the integral first optical assembly.

Embodiment 19 is a head-mounted display comprising a first optical system according to Embodiment 1 and a second optical system according to Embodiment 1 disposed proximate the first optical system.

Embodiment 20 is the optical system of Embodiment 1, wherein at least one of the integral first, second and third optical assemblies has a rotationally asymmetric edge.

Embodiment 21 is an optical system for displaying an object to a viewer, comprising:
- an integral first optical assembly, the integral first optical assembly comprising:
  - one or more first optical lenses; and
  - a reflective polarizer substantially transmitting light having a first polarization state and substantially reflecting light having an orthogonal second polarization state;
- an integral second optical assembly, the integral second optical assembly comprising:
  - one or more second optical lenses; and
  - a partial reflector having an average optical reflectance of at least 30% for a desired plurality of wavelengths; and
- an integral third optical assembly disposed between the integral first and second optical assemblies, the integral third optical assembly comprising a curved first phase retarder for changing a polarization state of light passing therethrough,
- wherein the reflective polarizer has a first radius of curvature at an apex of the reflective polarizer, the partial reflector has a second radius of curvature at an apex of the partial reflector, the first phase retarder has a third radius of curvature at an apex of the first phase retarder, the third radius of curvature being greater than a smaller of the first and second radii of curvature.

Embodiment 22 is the optical system of Embodiment 21, wherein the third radius of curvature is greater than the larger of the first and second radii of curvature.

Embodiment 23 is the optical system of Embodiment 21, wherein the third radius of curvature is at least twice the smaller of the first and second radii of curvature.

Embodiment 24 is the optical system of Embodiment 21, wherein the third radius of curvature is at least twice the larger of the first and second radii of curvature.

Embodiment 25 is the optical system of any one of Embodiments 21 to 24, wherein the third radius of curvature is no more than 10 times a larger of the first and second radii of curvature.

Embodiment 26 is the optical system of any one of Embodiments 21 to 24, wherein the third radius of curvature is no more than 10 times the smaller of the first and second radii of curvature.

Embodiment 27 is the optical system of Embodiment 21, where the first and second radii of curvature are different.

Embodiment 28 is the optical system of Embodiment 21, wherein the first and second radii of curvature are substantially the same.

Embodiment 29 is the optical system of Embodiment 21, comprising a display panel disposed proximate the second integral optical assembly opposite the first integral optical assembly.

Embodiment 30 is the optical system of Embodiment 21, wherein the desired plurality of wavelengths comprise a wavelength range of 400 nm to 700 nm.

Embodiment 31 is the optical system of Embodiment 21, wherein the reflective polarizer is a wire grid polarizer.

Embodiment 32 is the optical system of Embodiment 21, wherein the reflective polarizer is a polymeric multilayer optical film.

Embodiment 33 is the optical system of Embodiment 32, wherein the polymeric multilayer optical film comprises at least one layer that is substantially optically biaxial at at least one first location on the at least one layer away from an optical axis passing through an apex of the reflective polarizer and substantially optically uniaxial at at least one second location away from the optical axis.

Embodiment 34 is the optical system of any one of Embodiments 21 to 33, wherein the reflective polarizer is curved about two orthogonal axes.

Embodiment 35 is the optical system of any one of Embodiments 21 to 34, wherein the reflective polarizer has at least one first location having a radial distance, r1, from an optical axis passing through an apex of the reflective polarizer, and a displacement, s1, from a plane perpendicular to the optical axis at the apex, s1/r1 being at least 0.1.

Embodiment 36 is the optical system of Embodiment 35, wherein s1/r1 is at least 0.2.

Embodiment 37 is the optical system of Embodiment 21, further comprising a display panel, wherein the integral first optical assembly is disposed between the display panel and the integral second optical assembly.

Embodiment 38 is the optical system of Embodiment 21, further comprising a display panel, wherein the integral second optical assembly is disposed between the display panel and the integral first optical assembly.

Embodiment 39 is a head-mounted display comprising a first optical system according to Embodiment 21 and a second optical system according to Embodiment 21 disposed proximate the first optical system.

Embodiment 40 is the optical system of Embodiment 21, wherein at least one of the integral first, second and third optical assemblies has a rotationally asymmetric edge.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system for displaying an object to a viewer, comprising:
   an integral first optical assembly, the integral first optical assembly having a first focal length and comprising:
      one or more first optical lenses; and
      a reflective polarizer substantially transmitting light having a first polarization state and substantially reflecting light having an orthogonal second polarization state;
   an integral second optical assembly, the integral second optical assembly having a second focal length and comprising:
      one or more second optical lenses; and
      a partial reflector having an average optical reflectance of at least 30% for a desired plurality of wavelengths; and
   an integral third optical assembly disposed between the integral first and second optical assemblies, the integral third optical assembly having a third focal length and comprising a curved first phase retarder for changing a polarization state of light passing therethrough, wherein the third focal length is greater than a larger of the first and second focal lengths,
   wherein the reflective polarizer is curved about two orthogonal axes, the reflective polarizer having at least one location having a radial distance, r1, from an optical axis passing through an apex of the reflective polarizer, and a displacement, s1, from a plane perpendicular to the optical axis at the apex, s1/r1 being at least 0.1.

2. The optical system of claim 1, wherein the third focal length is at least twice a smaller of the first and second focal lengths.

3. The optical system of claim 1, wherein the third focal length is at least twice the larger of the first and second focal lengths.

4. The optical system of claim 1, wherein the third focal length is no more than 10 times the larger of the first and second focal lengths.

5. The optical system of claim 1, comprising a display panel disposed proximate the second integral optical assembly opposite the first integral optical assembly.

6. The optical system of claim 1, wherein the reflective polarizer is a polymeric multilayer optical film.

7. The optical system of claim 6, wherein the polymeric multilayer optical film comprises at least one layer that is substantially optically biaxial at at least one first location on the at least one layer away from the optical axis passing through the apex of the reflective polarizer and substantially optically uniaxial at at least one second location away from the optical axis.

8. A head-mounted display comprising a first optical system according to claim 1 and a second optical system according to claim 1 disposed proximate the first optical system.

9. An optical system for displaying an object to a viewer, comprising:

an integral first optical assembly, the integral first optical assembly comprising:
  one or more first optical lenses; and
  a reflective polarizer substantially transmitting light having a first polarization state and substantially reflecting light having an orthogonal second polarization state;
an integral second optical assembly, the integral second optical assembly comprising:
  one or more second optical lenses; and
  a partial reflector having an average optical reflectance of at least 30% for a desired plurality of wavelengths; and
an integral third optical assembly disposed between the integral first and second optical assemblies, the integral third optical assembly comprising a curved first phase retarder for changing a polarization state of light passing therethrough,
wherein the reflective polarizer has a first radius of curvature at an apex of the reflective polarizer, the partial reflector has a second radius of curvature at an apex of the partial reflector, the first phase retarder has a third radius of curvature at an apex of the first phase retarder, the third radius of curvature being greater than a larger of the first and second radii of curvature, wherein the reflective polarizer is curved about two orthogonal axes, the reflective polarizer having at least one location having a radial distance, $r1$, from an optical axis passing through the apex of the reflective polarizer, and a displacement, $s1$, from a plane perpendicular to the optical axis at the apex, $s1/r1$ being at least 0.1.

10. The optical system of claim 9, comprising a display panel disposed proximate the second integral optical assembly opposite the first integral optical assembly.

11. The optical system of claim 9, wherein the reflective polarizer is a polymeric multilayer optical film.

12. The optical system of claim 11, wherein the polymeric multilayer optical film comprises at least one layer that is substantially optically biaxial at at least one first location on the at least one layer away from the optical axis passing through the apex of the reflective polarizer and substantially optically uniaxial at at least one second location away from the optical axis.

13. A head-mounted display comprising a first optical system according to claim 9 and a second optical system according to claim 9 disposed proximate the first optical system.

* * * * *